Jan. 25, 1966  L. A. B. PILKINGTON  3,231,354
PROTECTIVE ATMOSPHERE FOR SHEET GLASS CASTING ROLLS
Original Filed June 7, 1957
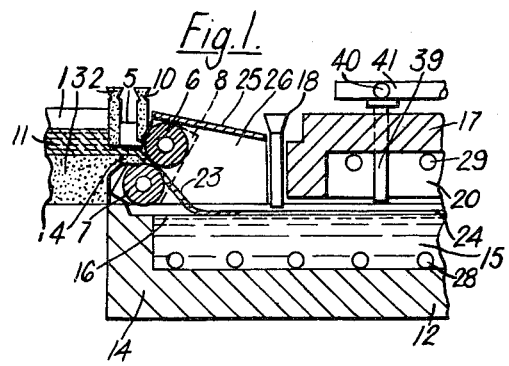
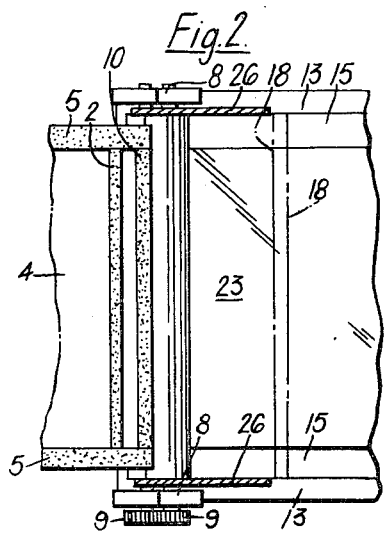
Inventor
Lionel A. B. Pilkington
By Morrison, Kennedy & Campbell
Attorneys

United States Patent Office 3,231,354
Patented Jan. 25, 1966

3,231,354
PROTECTIVE ATMOSPHERE FOR SHEET GLASS CASTING ROLLS
Lionel Alexander Bethune Pilkington, Rainhill, England, assignor to Pilkington Brothers Limited, Liverpool, England, a company of Great Britain
Original application June 7, 1957, Ser. No. 664,245, now Patent No. 3,083,551, dated Apr. 2, 1963. Divided and this application Dec. 27, 1961, Ser. No. 162,450
Claims priority, application Great Britain, May 3, 1957, 14,205
3 Claims. (Cl. 65—157)

This invention relates to the manufacture of flat glass and is a division from copending application Serial No. 664,245, filed June 7, 1957, Patent No. 3,083,551.

In the aforesaid copending application there is disclosed and claimed apparatus for producing flat glass on a support in the form of a bath of molten metal. The invention described in the aforesaid copending application comprises conventional rolling means for delivering a ribbon of glass at a controlled rate onto the support constituted by the bath of molten metal and advancing the glass on the support under thermal conditions which transform the ribbon into a layer of molten glass while ensuring unhindered lateral flow of the side edges of the layer to the limit of its free flow under the influence of the forces of surface tension and gravity.

In accordance with the present invention the conventional casting rolls operate in an enclosure in which enclosure a protecting atmosphere for the casting rolls is maintained at a plenum. The protecting atmosphere may be a reducing gas or a gas inert to the metal from which the casting rolls are manufactured. If a reducing atmosphere is employed it is convenient to supply to the enclosure commercial coal gas. By maintaining a plenum within the enclosure ingress of ambient atmospheres into the enclosure is prevented.

Accordingly the present invention comprises apparatus for rolling molten glass into ribbon form wherein the casting rolls, to which the molten glass is fed and by them converted into ribbon form as the molten mass enters the pass between them, are housed in an enclosure erected about the rolls and means are provided for maintaining at a plenum within the enclosure a protecting atmosphere to ensure that ingress into the enclosure of ambient atmospheres is prevented.

In one preferred form of apparatus according to the invention the apparatus comprises in combination within an enclosure metal casting rolls, regulatable means for delivering molten glass to the pass between the casting rolls, supporting means for carrying the ribbon of glass as it is advanced by the casting rolls, an end wall to the enclosure on the discharge side of the casting rolls, set with respect to the supporting means for the glass to permit the advance of the ribbon on the support, and means for supplying a protecting atmosphere for the casting rolls into the enclosure.

Such apparatus may comprise in accordance with the present invention a spout for delivering molten glass to the pass between the casting rolls, and characterised in that the supporting means for the ribbon of glass is a molten bath, said molten bath being confined in a tank structure comprising side walls, end walls and a floor, the side walls and the floor being integral each with the others, one end wall being disposed in contiguity with the spout, said side walls and the tank structure supporting the enclosure.

In order that the invention may be more clearly understood a preferred embodiment will now be described with reference to the accompanying diagrammatic drawings.

In the drawings FIGURES 1 and 2 are a sectional elevation and plan respectively of rolling means for converting molten glass into a ribbon of glass in association with supporting means for the glass ribbon produced, in the form of a bath of molten metal.

In the drawings like references designate the same parts.

In the construction shown in FIGURES 1 and 2 there is illustrated a forehearth of a continuous glass melting tank indicated at 1, a regulating tweel at 2 and a spout 3, the spout comprising a floor or "lip" 4 and side jambs 5 one of which only is illustrated in FIGURE 1, the side jambs and lip forming a spout of generally rectangular cross section. A cover may be secured over the spout.

Operatively associated with the spout are a pair of water-cooled casting rolls indicated at 6 and 7, and these rolls are mounted on frames 8, 8 in usual manner and driven through two tooth wheels 9, 9 by power means. A gate 10 is adjustably suspended in known manner (by means not shown) in a vertical plane in contiguity with the upper casting roll 6. The gate 10 shields the top roll 6 from the heat radiated by the molten glass 11 flowing from the forehearth over the lip 4 to the pass between the rolls 6, 7.

The upper casting roll 6 is disposed in advance of the lower casting roll 7 so that the molten glass 11 flows from the lip 4 onto an upper part of the roll 7 presenting to the glass a downwardly and forwardly directed arcuate casting bed moving in the same sense as the direction of the flow from the spout, thus the molten glass on leaving the spout and arriving on this casting bed is constrained to flow forwardly, thereby preventing backward flow of the molten glass leaving the spout 4.

The conventional ribbon forming means, just described, is in the construction illustrated, disposed over the floor 12 of a tank structure including also side walls 13 joined together at each end of the tank structure by end walls 14 only one of which is shown in FIGURE 1, said side walls being integral with the floor and end walls.

The tank structure is used to confine a molten bath 15 having the characteristic set out in the aforesaid Patent No. 3,083,551, the level of the surface of which bath is indicated at 16 of FIGURE 1. The surface of the molten bath acts as a support for the ribbon of glass 23, produced by the action of the casting rolls 6, 7, on the molten glass fed to the pass between them, which ribbon is advanced by the casting rolls, as it is formed, along the bath which latter because it has a higher specific gravity than the glass supports the ribbon 23 in a horizontal plane.

It will be seen that the end wall 14 of the tank structure meets the under-surface of the spout 3 and that the lower casting roll is in proximity to the end wall 14 of the tank structure.

The tank structure supports a roof structure including a roof 17 and a vertically adjustable end wall at each end of the roof structure, the adjustable end wall nearer the casting rolls is indicated at 18 in FIGURE 1 the other end wall is not shown, but is fully described in the aforesaid Patent No. 3,083,551. The roof structure provides a tunnel over the bath 15 and defines a headspace 20 thereover.

The adjustable end wall 18 of the roof structure forms part of an enclosure for the casting rolls the ceiling and side walls of which are indicated at 25 and 26 respectively, the side walls being carried by the side walls 13 of the tank structure and the ceiling 25 being extended back to the regulating gate 10.

Thermal regulators 28 and 29 within the tank structure and roof structure respectively, maintain the temperature required in the molten bath and in the headspace over the bath, requisite for carrying out the method of production as described in the aforesaid patent.

As fully described in the aforesaid patent a protecting atmosphere is maintained at a plenum in the head space 20 over the bath 15, the protecting atmosphere being supplied through a series of ducts 39 connected by branches 40 to headers 41. The presence of this protecting atmosphere over the molten bath prevents chemical reactions occurring at the surface of the bath and the passage of the protecting gases under the end wall 18 of the roof structure into the enclosure housing the rolls 6, 7 and comprising the ceiling 25, side walls 26, and end wall 18, ensures that the rolls 6, 7 operate in that atmosphere which envelopes them thereby protecting the rolls from corrosion on their surfaces.

Ordinary commercial coal gas can be supplied through ducting 39 to provide the protecting atmosphere and the existence of a plenum in the enclosure ensures that ingress into the enclosure of ambient atmospheres is prevented.

Instead of delivering the protecting gas into the enclosure by ensuring passage under the end wall 18, the protecting gas may be admitted directly into the chamber by piping not shown, which piping may be supplied from the same source of protecting gas as that supplied to the headers 41.

As is well known in the manufacture of flat glass by the conventional rolling methods all imperfections on the roller surfaces are imparted to the surfaces of the ribbon of glass produced by them and involve extensive mechanical surfacing operations on the glass in the production of a marketable commodity. By providing the protecting gas about the rolls the existence of such imperfections is considerably reduced.

I claim:

1. Apparatus for rolling molten glass into ribbon form comprising, in combination, a pair of casting rolls between which the molten glass is passed and by them converted into ribbon form, said rolls having glass contacting surfaces subject to corrosion, a housing which forms a head space over the casting rolls, and means for maintaining within the housing a protecting atmosphere which prevents ingress of ambient atmosphere.

2. Apparatus for rolling molten glass into ribbon form comprising, in combination, a pair of casting rolls between which the molten glass is passed and by them converted into ribbon form, said rolls having glass contacting surfaces subject to corrosion, a bath of molten metal onto which the glass ribbon is delivered by the casting rolls, a housing which forms a head space over the casting rolls, said housing having an end wall on the discharge side of the rolls set in spaced relation to the surface of the molten metal bath to permit the glass ribbon to be advanced along the bath under the end wall, and means for maintatining within the housing a protecting atmosphere which prevents ingress of ambient atmosphere.

3. Apparatus for rolling molten glass into ribbon form comprising, in combination, a pair of casting rolls between which the molten glass is passed and by them converted into ribbon form, said rolls having glass contacting surfaces subject to corrosion, a bath of molten metal onto which the glass ribbon is delivered by the casting rolls, a tank structure containing said molten metal bath and within which the casting rolls are mounted at the inlet end thereof, means defining a head space over the molten metal bath and the casting rolls, a wall in the head space on the discharge side of the casting rolls set in spaced relation to the surface of the molten metal bath to permit the glass ribbon to be advanced along the bath under the wall, and means for maintaining in the head space over the molten metal bath and the casting rolls a plenum of protecting gas which prevents the ingress of ambient atmosphere into said head space, the setting of the wall with respect to the ribbon passing thereunder permitting flow of the protecting gas from the head space over the molten metal bath into the head space over the casting rolls.

References Cited by the Examiner
UNITED STATES PATENTS

| 305,716 | 9/1884 | Schulze-Berge | 65—169 |
| 2,873,556 | 2/1959 | Hainke | 65—32 |
| 2,911,759 | 11/1959 | Pilkington et al. | 65—157 X |

DONALL H. SYLVESTER, *Primary Examiner.*

D. CRUPAIN, *Assistant Examiner.*